May 4, 1937. I. H. LEVIN 2,078,953

METHOD AND APPARATUS FOR COOLING A GAS

Original Filed Aug. 17, 1933

INVENTOR
Isaac H. Levin

Patented May 4, 1937

2,078,953

UNITED STATES PATENT OFFICE 2,078,953

METHOD AND APPARATUS FOR COOLING A GAS

Isaac H. Levin, Pittsburgh, Pa.

Application August 17, 1933, Serial No. 685,616
Renewed January 27, 1937

11 Claims. (Cl. 62—175.5)

This invention relates to conditioning air or similar gases as, for example, in the separation of air and other gaseous mixtures into their constituents by liquefaction and rectification.

While my improved method may be advantageously employed for just cooling of air or for the liquefaction of gases, or for the separation of gases from their mixtures, the description that follows will refer to the separation of air into its constituents.

Figure 1:
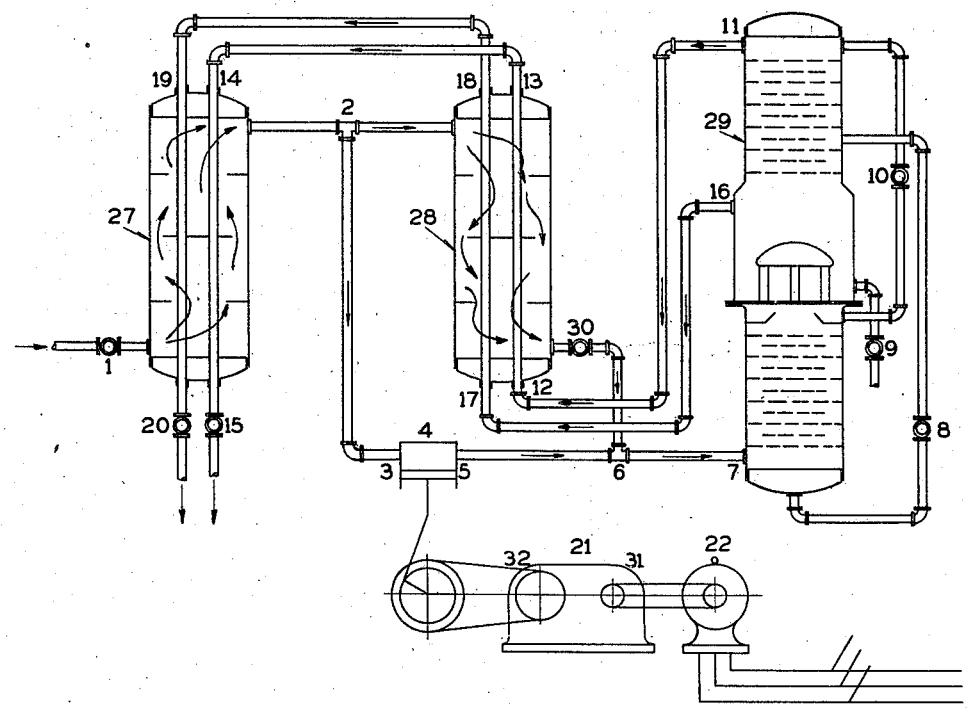
Figure 2:
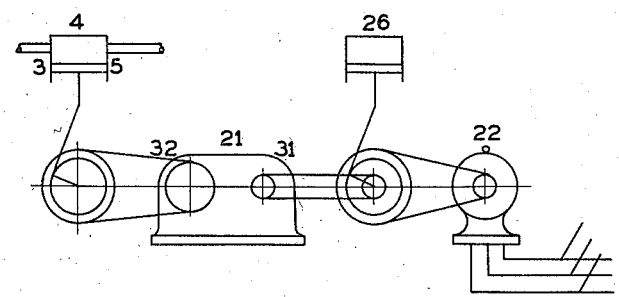

The means for carrying out my invention and the advantages to be gained thereby, will be clearly set forth in the following. The accompanying drawing Figures 1 and 2 illustrate diagrammatically examples of my invention.

The use of an engine or a turbine for the expansion of air with external work for the production of cold, or as a means for conditioning air, is extending very rapidly in the field of air liquefaction and in the separation of gases into their constituents. One of the aims in controlling the expander is to make as much use as possible of the energy that can be produced during the expansion of the air. Another aim is to control the speed of the expander so that it will deliver the maximum of refrigeration.

The means that have been used heretofore to control the operation of the expander have been more or less satisfactory from the point of view of either or one or the other of the above aims, but not from the standpoint of both. Attempts have been made to improve the methods of control so that both aims may be more fully attained.

In a recent patent it has been suggested to couple an induction generator with a wound rotor and a variable external resistance to an expander. It was expected that such a generator would be more advantageous than an ordinary induction motor connected to an expansion engine or turbine. It has, however, been found in practice that the regulation of speed through the variable external resistance does not permit of the speed changes required. For one, it has been found that for a given value of the resistance, the speed changes greatly with variations of the load and, furthermore, the speed attains practically its synchronous value at low loads whatever the resistance might be. Furthermore, the speed change brought about by change in the external resistance consumes a part of the energy, so that in addition to being a poor regulator, it fails in the other aim, namely, that the energy produced by the expander is consumed in considerable amounts in an attempt to regulate the speed.

A condition may arise when the work produced by the expander is insufficient to overcome the work necessary to operate moving parts of the expander and the other equipment connected therewith. The generator above referred to will then be required to act as a motor and drive the expander. Later on in the operation of the expander, the expander may do sufficient work to overcome all mechanical losses and operate the generator to send current into the power lines to which it is connected. Practice has shown that when the generator acts as a motor, a given external resistance causes the motor to run below synchronous speed, whereas when the generator operates as a generator delivering current to the line, a given external resistance causes the generator to operate above synchronous speed. Because of the above, an increase in the amount of work produced by the expander changing the generator from a motor to a generator is accompanied by a very considerable change in speed of the expander from below synchronous speed to above synchronous speed. Since it is desired even under these conditions to have a fairly close speed regulation for the expander, methods, differing from the use of an induction generator with a wound rotor and a variable external resistance, had to be worked out to get proper speed regulation and control.

I have found that the use of a speed changer depending upon the control of mechanical variables enables me to attain the aims already mentioned to the highest degree, as will be explained in the following.

Figure 1 is an assembly of apparatus for the separation of air into its constituents employing an expander, a means to make use of the work during the expansion of the air, and a means to control the operation of the expander. Compressed air, for instance, purified and treated in the usual manner enters interchanger 27 at 1, where it is cooled by the products of separation passing through pipes 14 and 19. The air then passes into interchanger 28 where it is further cooled by the products of separation through pipes 13 and 18. Another portion of the air passes from pipe joint 2 to engine 4, entering at 3 and exhausting at 5. This air passes pipe joint 6 and enters the column 29 at 7. The air from interchanger 28 is expanded in valve 30, passes through pipe joint 6 and then enters the column 29 at 7. The air entering the column is first separated into a crude oxygen consisting of oxygen and nitrogen, which is removed from the lower portion of the column, expanded through valve 8 and then is supplied as a feed to the upper portion of the column. Another portion of the air entering the column becomes practically pure nitrogen. It is removed from the lower column and expanded through valve 10 and supplied as a feed to the upper column. Rectification taking place in the upper column produces nitrogen leaving at 11 and oxygen vapors leaving at 16. Liquid oxygen can be removed at 9. When the column is warm, it must be conditioned to the temperature of the liquefied gas therein and considerable refrigeration must be produced in engine 4. Later on when the products of separation are removed in the gaseous form and the frigories therein are transferred to the incoming air, a comparatively small amount of refrigeration is produced in engine 4. Should oxygen be removed in liquid form, the amount of refrigeration that would be produced in engine 4 is considerably greater than when the gases are removed as vapors.

During the above described operating conditions, the pressure and the temperature of the air entering the engine will vary and likewise it will be necessary to modify and control the speed of the engine in order that the amount of air passing through the engine is properly proportioned to the air that does not pass through the engine, and so that the cold produced by the engine or turbine, if a turbine is used, be kept at its maximum. At the beginning of operations the air entering the engine will be at room temperature.

I find it very useful to use an ordinary induction motor shown at 22, and a mechanical speed reducer indicated at 21 in which 31 indicates a fixed speed shaft and 32 the variable speed shaft, and to connect with belt or otherwise the induction motor with the speed reducer and the speed reducer with the engine. The speed changes in the induction motor are very small even between the ranges of operation as between a motor and a generator, so that the induction motor in a sense acts as a stabilizer. Unit 21 may be a chain of gears whose relations can be modified one to the other to give a change in speed, or may be a combination of cone pulleys connected with a belt whose relations to one another can be changed so as to change the speed ratio between the speed of the induction motor and that of the engine. When the plant is being conditioned, the air entering engine 4 is comparatively warm and the engine must run at comparatively high speed in order that the necessary amount of air per unit of time can be expanded through the engine. As conditioning continues and the temperature of the air entering the engine is reduced, the volume of air per unit of time also drops and the speed of the engine 4 can then be reduced by making the proper shifts in the mechanical speed changer. By having full control over the speed of the engine, the engine becomes a very correct proportioning means for the quantity of air that is to be expanded with external work as against the quantity of air that is to be expanded through valve 30.

The arrangement shown in Figure 1, as between the engine 4, mechanical speed changer 21, and induction motor 22 can be so arranged as to be housed in a fairly compact unit with a shaft common to the engine and the speed reducer, instead of a belt connecting these two units together, and likewise the shaft and the other portion of the mechanical speed reducer can be in common with the shaft on the induction motor 22. Induction motor 22 is herein shown as a separate unit from the induction motor that can be used for driving the air compressor or other units used in the treatment of the air.

Figure 2 illustrates diagrammatically an arrangement whereby the mechanical speed reducer 21 may be connected with unit 26 used for compressing the air or any unit having a revolving part. If, for example 26, an air compressor is used, the mechanical speed reducer is belted or otherwise connected to the shaft of the air compressor, which in turn is connected by belting or otherwise to the shaft of a motor 22 or a prime mover. The shaft of the speed reducer 21 could also be connected directly to the shaft of the motor 22. The expander could be connected with compressor 26 through the intermediary of the mechanical speed reducer instead of an ordinary coupling. This would make a very efficient layout and one in which all the aims desired in operating the expander could be obtained with great ease and with high efficiency.

My invention is not limited to a process wherein the air entering the engine is precooled, as it may be applied to a condition where the air entering the engine is at room temperature.

I claim:

1. A method for producing refrigeration and power which comprises expanding a gas to do external work, transmitting the work developed to shaft work of the expander, converting the said work into electrical energy thereby producing an electrical brake for the shaft work, coupling the shaft work with the electrical brake, and controlling the quantity of gas to be expanded by controlling the angular velocity of the shaft of the expander by modifying mechanical variables in the coupling.

2. A method of producing refrigeration and power which comprises expanding a gas to do external work, transmitting the work developed to shaft work of the expander, developing alternating current electrical energy therewith producing an electrical brake for the said shaft work, coupling the shaft work with the electrical brake, and controlling the amount of refrigeration produced by controlling the angular velocity of the shaft of the expander by modifying mechanical variables in the coupling.

3. A method for producing power which comprises expanding a gas to do external work, transmitting the work developed to the shaft work of the expander, developing electrical energy therewith to produce an electrical brake for the said shaft work, coupling the shaft work with the electrical brake, and controlling the quantity of gas to be expanded and the refrigeration by controlling the angular velocity of the shaft of the expander by modifying mechanical variables in the coupling.

4. A method for producing refrigeration and power which comprises expanding a gas to do external work, transmitting the work developed to shaft work of the expander, developing mechanical energy therewith to produce a mechanical brake for the said shaft work, controlling the quantity of gas to be expanded and the refrigeration to be produced by controlling the angular velocity of the shaft of the expander by modifying mechanical variables in the coupling, supplementing the work so developed by coupling the shaft work from an external source with the shaft work of the mechanical brake and maintaining the angular velocity of the shaft of the mechanical brake constant.

5. A method for producing refrigeration and power which comprises expanding a gas to do external work, transmitting the work developed to shaft work of the expander, developing mechanical energy therewith to produce a mechanical brake for the said shaft work, controlling the amount of refrigeration produced and the quantity of gas to be expanded by controlling the angular velocity of the shaft of the expander by modifying mechanical variables in the coupling, supplementing the work so developed by coupling the shaft work from an electrical motor with the shaft work of the mechanical brake, and maintaining the angular velocity of the shaft of the mechanical brake constant.

6. An apparatus for producing refrigeration and power which comprises a gas expander, means to precool the gas before entering the expander, an electrical generator, a mechanically variable speed reducer coupled between the expander and the generator.

7. An apparatus for producing refrigeration and power which comprises an expander, an electrical motor, means for compressing a fluid, a mechanically variable speed reducer coupled between the expander and the electrical motor, and a fixed speed drive coupled between the motor and the means to compress a fluid.

8. A method of cooling a gas which comprises expanding the gas to do external work, transmitting the work developed to shaft work of the expander, supplementing the work so developed by coupling the shaft work from an external source with the shaft work of the expander, controlling the quantity of gas to be expanded by controlling the angular velocity of the shaft of the expander by modifying mechanical variables in the coupling.

9. A method of cooling a gas which comprises precooling a gas under pressure, expanding the gas to do external work, transmitting the work developed to shaft work of the expander, supplementing the work so developed by coupling the shaft work from an external source with the shaft work of the expander, controlling the quantity of gas to be expanded and the refrigeration to be produced by controlling the angular velocity of the shaft of the expander by modifying mechanical variables in the coupling.

10. A method of cooling a gas under pressure which comprises expanding one portion of the gas by Joule Thomson expansion, expanding a second portion with production of external work, transmitting the work developed from the said second portion to shaft work of the expander, converting the said work into electrical energy, thereby producing an electrical break for the shaft work, coupling the shaft work with the electrical break, proportioning the quantity of the said second portion of gas to the total gas under pressure by controlling the angular velocity of the shaft of the expander by modifying mechanical variables in the coupling.

11. An apparatus for producing refrigeration and power which comprises means for compressing a gas, means for supplying one portion of gas from the said compressing means to a gas expander, means for removing the expanded gas from said expander, an electrical generator, a mechanically variable speed changer, coupled between the expander and the electrical generator, means for supplying a second portion of gas from the said compressing means to an expansion valve, and means to bring this said second portion of gas before it reaches the expansion valve into heat transfer contact with the said expanded gas removed from the expander.

ISAAC H. LEVIN.